US012636220B2

(12) United States Patent
Belforte et al.

(10) Patent No.: US 12,636,220 B2
(45) Date of Patent: May 26, 2026

(54) SUSPENSION AND WEIGHT RELIEF SYSTEM FOR WALKING ON THE GROUND AND FOR LEG REHABILITATION EXERCISES

(71) Applicants: Guido Belforte, Turin (IT); Paolo Giovanni Luca Belforte, Rome (IT)

(72) Inventors: Guido Belforte, Turin (IT); Paolo Giovanni Luca Belforte, Rome (IT)

( * ) Notice: Subject to any disclaimer, the term of this patent is extended or adjusted under 35 U.S.C. 154(b) by 311 days.

(21) Appl. No.: 18/466,106

(22) Filed: Sep. 13, 2023

(65) Prior Publication Data

US 2024/0099925 A1 Mar. 28, 2024

(30) Foreign Application Priority Data

Sep. 28, 2022 (IT) ........................ 102022000019959

(51) Int. Cl.
*A61H 3/00* (2006.01)

(52) U.S. Cl.
CPC ..... *A61H 3/008* (2013.01); *A61H 2201/1215* (2013.01); *A61H 2201/1238* (2013.01); *A61H 2201/149* (2013.01); *A61H 2201/1652* (2013.01); *A61H 2201/5056* (2013.01); *A61H 2201/5061* (2013.01)

(58) Field of Classification Search
CPC ............ A61H 3/008; A61H 2201/1215; A61H 2201/1238; A61H 2201/149; A61H 2201/1652; A61H 2201/5056; A61H 2201/5061; A61H 2201/0176; A61H 2201/1246; A61H 2201/1261; A61H 2201/1621; A61H 2201/165; A61H 2201/1664; A61H 2201/5084
See application file for complete search history.

(56) References Cited

U.S. PATENT DOCUMENTS

| | | | | |
|---|---|---|---|---|
| 5,456,655 A * | 10/1995 | Morris | A61G 7/1042 | 5/81.1 R |
| 2007/0004567 A1 * | 1/2007 | Shetty | A61H 3/008 | 482/69 |
| 2014/0087922 A1 * | 3/2014 | Bayerlein | A63B 21/00181 | 482/54 |
| 2014/0206503 A1 * | 7/2014 | Stockmaster | A61H 3/008 | 482/4 |

(Continued)

FOREIGN PATENT DOCUMENTS

| | | | |
|---|---|---|---|
| WO | WO-2009023321 A2 * | 2/2009 | A61H 3/008 |
| WO | WO-2019180751 A1 * | 9/2019 | A61H 3/008 |

*Primary Examiner* — Andrew S Lo

(74) *Attorney, Agent, or Firm* — Flener IP & Business Law

(57) ABSTRACT

A suspension and weight relief system (1) is described, designed to allow for walking on the ground and for leg rehabilitation exercises of a patient (2), the system (1) comprising: a suspension rail (3); and a suspension and weight relief element (1') designed to slide along the suspension rail (3), the suspension and weight relief element (1') comprising: rail bearing devices; a drive assembly with sensors and a control system; at least two belts or ropes (4, 4') arranged for the right side and the left side of the patient (2); a management system with microprocessor; a support structure and a protective carter; a unit (6) for managing electricity; means (7) for energy transmission; and an interface (8) for the operator.

19 Claims, 5 Drawing Sheets

(56) References Cited

U.S. PATENT DOCUMENTS

| | | | | |
|---|---|---|---|---|
| 2015/0320632 | A1* | 11/2015 | Vallery | A61G 7/1042<br>482/69 |
| 2016/0228746 | A1* | 8/2016 | Jayakumar | G16H 40/63 |
| 2016/0256346 | A1* | 9/2016 | Stockmaster | G16H 40/63 |
| 2017/0087392 | A1* | 3/2017 | Lambert | A61H 3/008 |
| 2018/0193217 | A1* | 7/2018 | Von Zitzewitz | A61H 3/008 |
| 2020/0037926 | A1* | 2/2020 | Tomczak | A61H 3/008 |
| 2020/0230005 | A1* | 7/2020 | Hidler | A61G 7/1042 |
| 2021/0030615 | A1* | 2/2021 | Belforte | A61H 1/0266 |
| 2022/0395418 | A1* | 12/2022 | Mitschke | A61H 3/008 |

* cited by examiner a) b)

SUSPENSION AND WEIGHT RELIEF SYSTEM FOR WALKING ON THE GROUND AND FOR LEG REHABILITATION EXERCISES

BACKGROUND OF THE INVENTION

1) Field of the Invention

The present invention relates to a suspension and weight relief system for walking on the ground and for leg rehabilitation exercises.

In general, the field of application is that of lifting and weight relief devices (called BWS—Body Weight Supports) used to allow people who are harnessed and partially relieved of their weight to carry out movements for gait rehabilitation and for leg exercises, making the person move on the ground without and with the use of exoskeletons.

2) Background Art

In general, the current state of the art of devices for handling patients without an exoskeleton is represented by numerous models of BWS, hooked to suspended rails or connected to mobile structures with wheels on the ground, most of which are dedicated to moving of patients between bed, wheelchairs and treatment tables. The purpose is to facilitate handling for logistical needs or to keep the legs active. Examples of these BWS are represented by various commercial models, such as LIKO (Hill-Room), Human Care, Dolphin Lifts, etc., intended as an aid for travel and not for directly carrying out treatments and exercises.

In particular, there are then suspension and weight relief systems to be used especially on a harnessed patient able to move freely on the ground for carrying out rehabilitation activities. For example, the following models can be considered:

a) BWS by BIONESS Inc. (Patent: US 2014/0201905 A1 dated Jul. 24, 2014 "Methods and Apparatus for Body Weight Support System" and US 2014/0201906 A1 dated Jul. 24, 2014 "Methods and Apparatus for Body Weight Support System");

b) BWS SafeGait by Gorbel Inc. (US Patent 2016/0256346 A1 dated Sep. 8, 2016 "Medical rehab body weight support system and method with horizontal and vertical force sensing and motion control" and US 2016/0367429 A1 dated Dec. 22, 2016 "Body Harness" and U.S. Pat. No. 10,478,371 B1 dated Nov. 19, 2019 "Medical rehab body weight support system and method with horizontal and vertical force sensing and motion control");

c) BWS ZeroG by ARETECH (Patent US 2008/0287268 A1 dated 20 Nov. 2008 "Body weight support system and method of using the same" and U.S. Pat. No. 7,883,450 B2 dated 8 Feb. 2011 "Body weight support system and method of using the same");

d) BWS FLOAT, U.S. Pat. No. 11,077,009 B2 dated Aug. 3, 2021 "Apparatus to Apply Forces in a Three-Dimensional Space".

The first three models include a mobile BWS along a ceiling-suspended guide, to which a slinged patient is connected via a single suspension element (a single belt or a single rope). The BWS is motorized so as to follow the horizontal movements of the patient, keeping the belt/strap substantially vertical. In the BIONESS and ZeroG systems, a rope is used for patient suspension, in the SafeGait system there are models with both belts and ropes.

The use of a belt helps control the direction of patient advancement and allows for easy winding of the belt on a pulley to adjust its length according to each patient's needs. The use of a rope allows a wide freedom of movement of the patient in any direction and an easy reversal of the direction of motion at the end of a linear path, but can present some problems in winding and unwinding the rope on a drum on which it is collected.

A web/rope tension control system is always provided with a tension measurement sensor and adjustment of the lifting/lowering electric motor. For the advancement of the BWS, sensors are used which detect the variation of the inclination of the belt/strap when the patient tends to advance or the variation of the thrust of the same belt/strap with a force sensor.

In all cases, there are connections between the end of the belt/strap and the patient's harness via a balancer connected at its ends to a pair of belts for each shoulder. Therefore, factors common to the cited systems of the current state of the art are the uniqueness of the suspension element (belt/strap) and its connection to the patient with the doubling of the support device near the patient with a rocker arm and double belts connected to the right side and left side of the person.

This solution is very simple and allows a relative oscillation between the shoulders, but it can have critical balance issues for the patient since the balance wheel can rotate around the constraint point, even causing the patient to tilt uncontrollably. Solutions with a harness that has a single lane point, as shown in the walk rehabilitation system with exoskeleton of the patent WO 2019/180751 (EP 19719373.3) "System for Rehabilitating the Walk and Weight Supporting Device for Such System", are efficient for stability and balance, but tend to reduce the patient's vision with belts very close to the head. Thus, the freedom of perception is limited, a particularly important condition in assisted rehabilitation with a BWS without exoskeleton, which must take place without constraints and in circumstances as close as possible to those of natural walking.

An effective solution for improving the perception of balance and a strong freedom of movement is achieved if the suspension elements exiting the BWS are split, with two separate belts/ropes between the BWS and the patient. This double suspension, then connected to the right and left side of the patient with further belts, can allow a pure up and down motion with equal movements, or an oscillation around the advancement axis with opposite movements, or even a motion with two different, more natural and more complex, motions. A correct limitation of movements then prevents falls and helps to regain control of the path, in case of loss of balance.

This principle can be extended to a greater number of suspension elements coming out of the BWS (three, four, etc.), for a possibly more complex management of the patient's balance.

The invention therefore has important advantages with respect to the state of the art of devices which allow walking on the ground, facilitating the patient's balance, increasing their confidence and sense of autonomy, guaranteeing good safety conditions in moving freely and leaving a full visual perception.

Solutions based on the use of two independent suspension elements for the patient (right side and left side) can be found on lifts for fixed station equipment, wherein the patient is stationary with respect to the ground and walks on a treadmill, therefore in completely different positions from the operative ones of the invention, which provides for the patient to walk freely on the ground with full perception of the movement with respect to the space wherein he is located. In addition, these systems lack all the various elements that contribute to its complete functioning with weight relief, the possibility of moving forward on the ground, the possibility of lowering and getting up, the presence of anti-fall systems, etc.

U.S. Pat. No. 5,372,561 A (Dec. 13, 1994) "Apparatus for Suspension Assisted Ambulation" provides for a suspension system for a patient who performs exercises on a treadmill without an exoskeleton. The suspension takes place with a harness with two suspension straps (right shoulder and left shoulder) connected to a crossbar that rotates with respect to the fixed frame around a horizontal axis. The crosshead is raised and lowered by two pneumatic cylinders connected to a tank, whose thrust pressure is controlled by a pressure transducer and supply and discharge solenoid valves. A single frame carries the two belts, which are forced to move simultaneously. Therefore, relative oscillations between the patient's shoulders are not possible, as instead occurs in the invention. Furthermore, this system requires moving a large crosspiece and therefore handling significant masses, with problems in maintaining a constant force in the motion reversal phase, which constitutes a particularly critical phase to avoid unpleasant sensations for the patient.

Another solution with two suspension elements is indicated in patent: US 2004/0005962 A1 dated 8 Jan. 2004 "Bi-lateral Body Weight Support System". The application refers to a lift in a fixed station on a treadmill. The system is mechanically complex, providing a large fixed frame with a treadmill, two rotating crosspieces for adaptation to the patient, each of which is associated with a double patient connection system, one for suspension and one for oscillation compensation with pneumatic device. The system therefore operates in totally different conditions, being able to operate only with a fixed station, without all the advantages offered by the invention which operates with walking on the ground.

As regards the FLOAT device (U.S. Pat. No. 11,077,009 B2 dated Aug. 3, 2021 "Apparatus to Apply Forces in a Three-Dimensional Space"), it should be noted that it is essentially a rope robot which controls the position of a patient suspension apparatus. This is accomplished by changing the binding position and length of four cables that are connected to a patient suspension platform. The system, which brings together the cables for applying forces to the patient in a single area, has the same balance problems as other state-of-the-art devices that use a balance wheel. Furthermore, the presence of ropes that stretch in the space between the patient and the actuation devices forces to allocate large spaces to a single rehabilitation system. On the contrary, the invention which uses a BWS that moves on a rail produces a relatively modest encumbrance, as it is possible to have several rails with several BWS or several BWS on a single rail in the same space.

The lifting and weight relief devices (BWS), whether they are intended for the movement of the patient on the ground (mobile BWS), or for walking on a treadmill (fixed station BWS), must allow the adjustment of the suspension system of the patient for support and weight relief and to allow vertical oscillations during walking. Often the two functions are performed by different devices. In case of compensation for oscillations during walking, the main techniques used are: balancing masses, elastic springs, automatic systems with force measurement, pneumatic systems.

Examples of systems with balancing masses are:

- patent EP 1 772 134 A1 (Nov. 4, 2007) "Device and Method for an Automatic Treadmill Therapy" (LOKOMAT System);
- US patent 2013/0137553 A1 (May 30, 2013) "Walking Training Apparatus";
- US patent 2014/0378279 A1 (Dec. 25, 2014) "Walking Training Apparatus";
- U.S. Pat. No. 10,238,318 B2 (Mar. 26, 2019) "Treadmill Training Device Adapted to Provide Targeted Resistance to Leg Movement".

All have problems in the phase of reversal of the direction of movement of the masses, with dynamic actions that disturb the patient. They tend to be uncomfortable.

Systems with springs:

- U.S. Pat. No. 6,244,991 B1 (Jun. 12, 2001) "Method and Apparatus to Exercise Developmentally Delayed Persons" (walking on the ground and BWS on guides above) provides for the use of a spring connection between the end of a lifting rope and the patient suspension crossbar parallel to a damper.
- U.S. Pat. No. 5,704,881 (Jan. 6, 1998) "Apparatus for Counterbalancing Rehabilitating Patients" (treadmill without exoskeleton) provides for a spring connected to the end of a lifting rope fixed to a frame to relieve the patient and compensate for his oscillations. The spring is adjusted and tensioned by a linear actuator.
- U.S. Pat. No. 6,273,844 B1 (Aug. 14, 2001) "Unloading System for Therapy, Exercise and Training" (treadmill without exoskeleton) provides for a pneumatic lifting system to relieve the weight and a spring system to compensate for small oscillations in the path;
- US Patent 2008/0287268 A1 dated Nov. 20, 2008 "Body weight support system and method of using the same" and U.S. Pat. No. 7,883,450 B2 dated Feb. 8, 2011 "Body weight support system and method of using the same". These are the patents referred to ARETECH's BWS ZeroG. There is a system with springs whose preload is adjusted with an electric motor.

These systems with springs are simple, in many cases, but generally have limitations for the regulation of the force and for the maintenance of its value during the oscillation of the patient's body due to the inevitable variation in the length of the spring.

Systems with closed loop control:

- Patent CN 101518490 A (2006) "Active partial body weight support treadmill training device and active partial body weight support treadmill training method" uses an adjustment with constant lifting force based on the use of a load cell that controls the movement of an electric motor which moves one end of the lifting rope.
- U.S. Pat. No. 7,462,138 B2 (Dec. 9, 2008) "Ambulatory Suspension and Rehabilitation Apparatus" (walking on the ground without an exoskeleton) provides for the control of the vertical force with a sensor and an electronic system.
- U.S. Pat. No. 7,381,163 B2 (Jun. 3, 2008) "Closed-loop Force Controlled Body Weight Support System" (treadmill without exoskeleton) provides for an electric system for regulating the position of a rope placed on a fixed frame and a pneumatic or hydraulic cylinder, controlled by a closed-loop control that regulates the tension value of the rope with a force sensor, to allow oscillations while walking on a treadmill. The adjustment of the rope with an electric system that involves moving the actuator by fluid requires an adequate overall length and does not allow the use of the system on ceiling mobile BWS. The invention allows placing two systems (one for adjusting the position of the patient's harness for preparing to walk or for carrying out lifting/lowering exercises and the other for small oscillations during walking on the ground) on a BWS connected to a ceiling rail. This allows easy walking on the ground, making rehabilitation exercises very natural.

Systems based on compressed air devices are the patents already considered:

U.S. Pat. No. 5,372,561 A (Dec. 13, 1994) "Apparatus for Suspension Assisted Ambulation";

US patent 2004/0005962 A1 (8 Jan. 2004) "Bi-lateral Body Weight Support System"

In the invention, any prior art system (for example, with a closed-loop control system on a force sensor, a device with adjustable springs, etc.) can find valid application. Moreover, a preferred device consists of a balancing pneumatic cylinder placed on each of the two connecting belts/ropes of the BWS. This is a prior art solution, well known in general for balancing equipment and already applied in particular to patient support devices. In patent WO 2019/180751 (EP 19719373.3) "System for Rehabilitating the Walk and Weight Supporting Device for Such System" a pneumatic cylinder for balancing the oscillations is applied to a BWS intended to operate with patients with exoskeleton, with different and more limited functions compared to the found. In fact, the cited system operates with a single belt for connection to the patient; it lacks belt tension measurement and control and cannot make the patient perform lifting/lowering operations, being bound to an exoskeleton whose dimensions are adjusted according to the patient's anthropometric measurements and are blocked.

SUMMARY OF THE INVENTION

Due to the double belt/strap, the invention allows walking on the ground and performing numerous exercises of various types, always guaranteeing good conditions of balance and an excellent field of vision for the patient. Furthermore, by using a balancing system of the small oscillations during walking on each belt/strap exiting the BWS (for example, two independent balancing cylinders), it is also possible to apply a different weight relief on the two sides of a patient, loading in the patient's legs in a different way according to the therapeutic needs.

The above and other objects and advantages of the invention, as will appear from the following description, are achieved with a suspension and weight relief system such as the one described in claim 1. Preferred embodiments and non-trivial variants of the present invention form the subject matter of the dependent claims.

It is understood that all attached claims form an integral part of the present description.

BRIEF DESCRIPTION OF THE DRAWINGS

The present invention will be better described by some preferred embodiments thereof, provided by way of non-limiting example, with reference to the attached drawings, wherein.

DETAILED DESCRIPTION OF PREFERRED EMBODIMENTS

Referring to the Figures, a preferred embodiment of the present invention is shown and described. It will be immediately obvious that innumerable variations and modifications can be made to what is described (for example relating to shape, dimensions, various colours and parts with equivalent functionality) without departing from the scope of the invention as appears from the attached claims.

As briefly seen, the main purpose of the suspension and weight relief system (called BWS—Body Weight Support) for walking on the ground and for leg rehabilitation exercises is to more or less partially support a patient during rehabilitation activities or maintaining the good functionality of the legs, performing numerous exercises of various types, effortlessly for advancement and in safety.

The gait rehabilitation exercises will consist of:

walking exercises on the ground with progress on flat ground, on ramps and on stairs;

sitting/standing exercises, lifting and lowering and, in general, leg exercises in a fixed position.

In general, the field of application is that of lifting and weight relief devices used to allow people harnessed and partially unburdened to carry out movements for gait rehabilitation and for leg exercises, making the person move on the ground without or with the use of exoskeletons. The invention can also find application in gymnasiums, in support of sporting activities, in circus games, in entertainment activities.

To allow walking to be performed on the ground, the patient must be in contact with the ground and be harnessed and connected to the BWS so as to be partially relieved of his own weight to facilitate muscle action. In this way, the burden of moving the legs is left to the patient himself. As the patient advances on the ground, the BWS moves by sliding along a suspended rail so as to follow the movement of the patient without the latter perceiving its motion.

The BWS allows the normal vertical oscillation of the patient while walking on the ground and intervenes by controlling the vertical movements in the event of heeling and/or loss of balance which could lead to falls.

For the execution of sitting/standing exercises and, in general, lifting and lowering exercises, the BWS, which can be locked in a fixed position without the possibility of moving along the rail, allows the patient to move vertically, following the movements and constantly guaranteeing safety conditions against skidding or falling.

Figure 1:
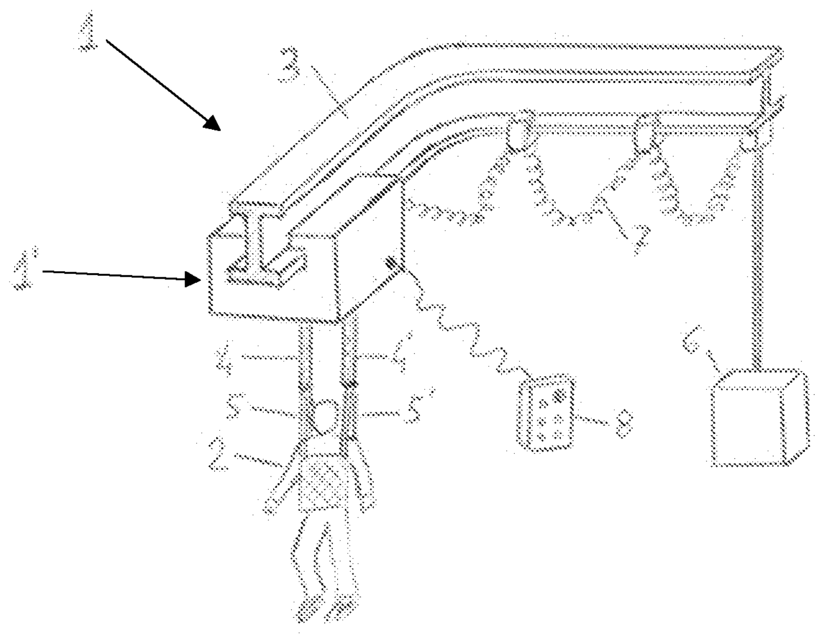
FIG. 1 shows a general diagram of the BWS of the invention with the connected devices.

The general scheme of the BWS applied to the suspension of a patient is shown in FIG. 1.

The system 1 of the invention for suspension and weight relief is designed to allow for walking on the ground and for leg rehabilitation exercises of a patient 2, and comprises:

a suspension rail 3; and a suspension and weight relief element 1' designed to slide along the suspension rail 3.

The suspension and weight relief element 1' comprises: devices for supporting the rail of the prior art; a motorization unit with suitable sensors and a control system, which moves the suspension and weight relief element 1' along the rail 3 to follow the patient 2 as he walks or activates his block for performing exercises from stopped; an assembly 1A for suspending and relieving the weight of the patient 2 which ends with at least two belts or ropes 4 and 4' arranged for the right side and the left side of the patient 2, which are each connected to a pair of belts 5 and 5 of a sling of the patient 2; a management system with microprocessor to allow the correct execution of the exercises, to avoid the accidental fall of the patient 2 and to acquire all necessary data; a support structure for all components of the suspension and weight relief element and a protective casing (not shown); a unit 6 for the management of electricity and for the possible generation of compressed air, if pneumatic devices are used; means 7 for transmitting energy to the suspension and weight relief element 1', such as cables suspended from the rail or other prior art systems; electric cables or wireless systems (not shown) for the transmission of command and data signals between the suspension and weight relief element 1' and devices for interface with an operator; and at least one interface 8 for the operator to set up the operating cycles and for emergency signals, for example a control keypad or a touch-screen interface.

Advantageously, the invention also comprises a rotation device 40 of the patient 2 to allow the movement to be reversed at the end of a linear path or to rotate the patient 2 by an angle suitable for performing exercises in a fixed position, such as sitting and standing exercises, lifting and lowering exercises, and so on. This rotation assembly can be placed inside the suspension and weight relief element, between the advancement assembly of the suspension and weight relief element 1' along the rail 3*e* and the assembly 1A for managing the suspension of the patient 2, or between the ends of the belts/straps 4, 4', 5, 5' which exit below the suspension and weight relief element 1' and the harness of the patient 2. In the first case, wherein the patient 2 suspension management unit rotates together with the patient 2, elements of the prior art could be used, comprising for example an electric motor and motion transmission elements with pinion and crown wheel. In the second case, devices of the type shown below can be used.

The drive assembly of the prior art for the advancement of the suspension and weight relief element 1' along the rail 2 can be operated with an electric motor on board the suspension and weight relief element 1' or with a motor external to the element for suspension and reduction of the fixed weight 1' and a transmission system made with traction ropes, toothed belts or other devices known to those skilled in the art.

The compressed air generator can be placed on the ground or on the suspension and weight relief element 1'.

Advantageously, for the energy transmission cables and any signals, spiral cables can be used suspended in a festoon to the rail 3 to support the suspension and weight relief element 1'. In this way, the stretch capacity of the suspended cables is maximized, taking into account both the length of the festoon and the stretch capacity of the coiled cables.

Figure 2:
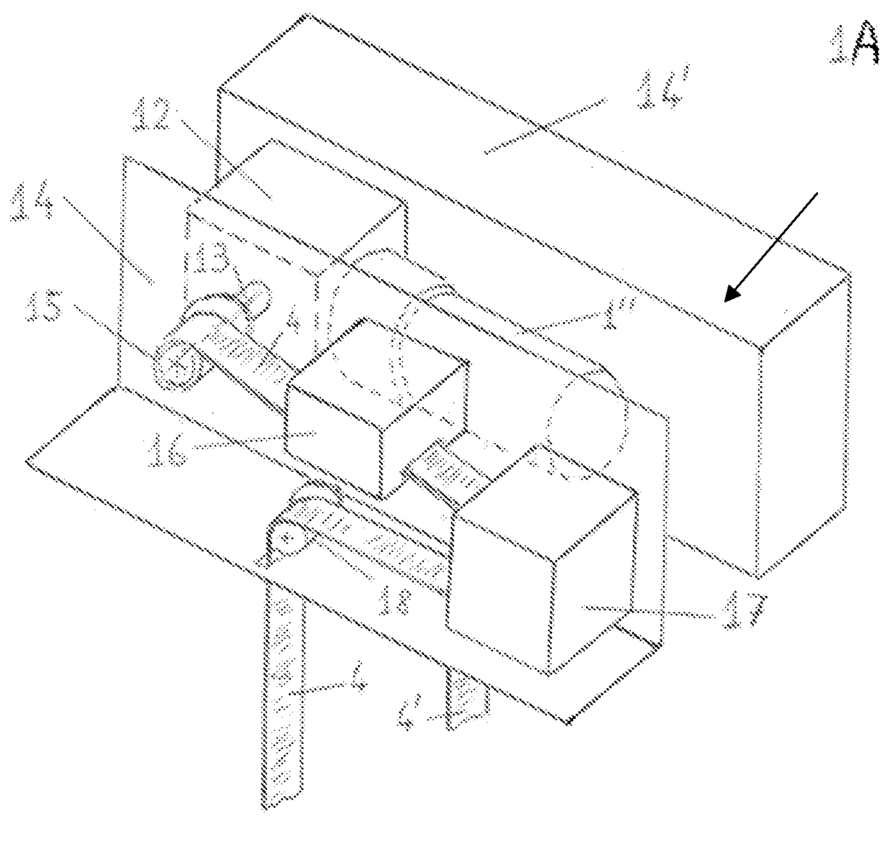
FIG. 2 shows a diagram of the basic elements of the BWS of the invention.

The diagram of the assembly 1A for managing the suspension and relieving the weight of patient 2, which has original and innovative elements with respect to the current state of the art, is shown in FIG. 2.

In particular, it comprises: an electric motor 1" which drives a reduction unit 12 with two output shafts 13 (only one shown) symmetrical with respect to the reduction unit 12; two symmetrical units 14 and 14' each connected to one of the two output shafts 13 and comprising a driving pulley 15 (the corresponding pulley in the unit 14' is not shown) on which the belts 4 and 4' are wound or unwound, a device 16 (the corresponding device in the assembly 14' is not shown) for measuring the tension in the belts 4 and 4', a device 17 (the corresponding device in the assembly 14' is not shown) for allowing free oscillations during the journey, and a transmission pulley 18 (the corresponding pulley in the assembly 14' is not shown) for the transmission of the belt and to allow its vertical descent.

The device 16 for measuring the tension of the belts 4, 4' can be used to control the electric motor 1" with reducer 12 for winding and unwinding a belt 4, 4' on the suitable pulley 15 (in phase lifting and lowering of the patient) or to also control the device 17 which allows free oscillations in the path, if this device 17 is a closed-loop controlled system.

The succession between the device 16 for measuring the tension of the belts 4, 4' and the device 17 which allows free oscillations along the way is not decisive, therefore they can be reversed with each other and can be placed in any position of the suspension system, even outside the element 1', for example on the rotation device.

An element of absolute originality in this solution is the use of a gearmotor 1", 12 with two output shafts 13 for driving two independent belts 4, 4' in the context of small relative displacements, which help the movement, facilitate the sense of safety in the patient 2 and avoid accidental falls.

As is clear to technicians in the field, the system finds easy extensions in: use of different means of suspension (belt or rope); use of the invention in fixed station systems with treadmill or in mobile systems with rail; use of more than two belts/ropes for a more complete and complex management of the patient's balance 2; use with patient 2 without exoskeleton or with exoskeleton.

Figure 3:
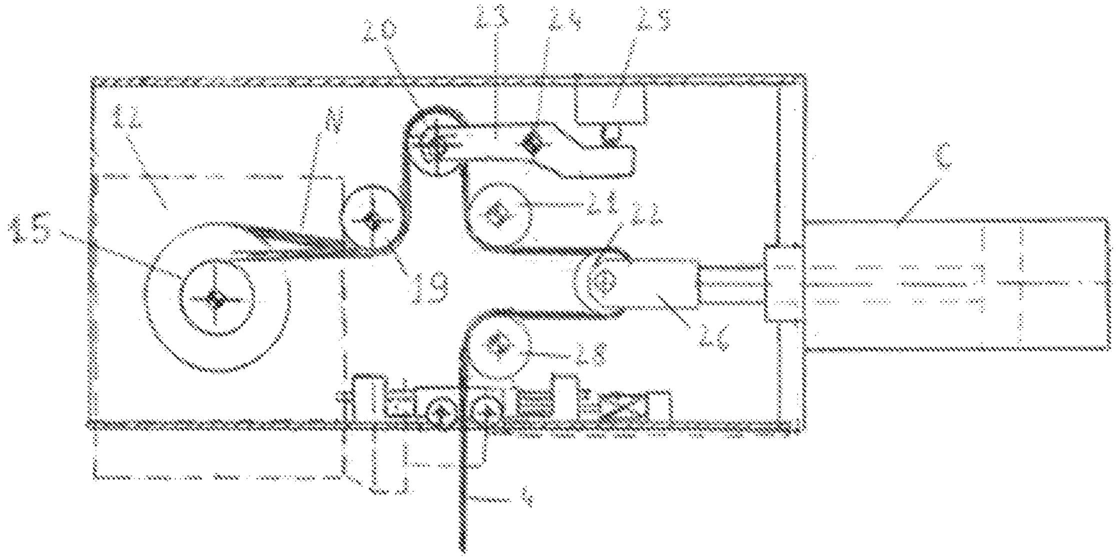
FIG. 3 shows a preferred embodiment of the BWS of the invention.

FIG. 3 shows a preferred embodiment of one of the two belt management assemblies. It comprises: the pulley 15 rotated by one of the two shafts 13 which come out of the reducer 12 driven by the electric motor 1", which serves to wind and unwind the belt 4 connected to the rotation device; a assembly of further pulleys 19, 20, 21, 22; a cylinder C, preferably pneumatic, to manage weight relief and vertical oscillation during walking; a first unit with sensors for measuring the web tension; a second unit with sensors for measuring the thrust force on the element 1' consequent to the intention to move forward of the patient 2 and to control the electric motor (not shown) for the movement of the element 1' along the rail 3; other sensors and elements for system control and management.

Starting from the winding pulley 15, the belt 4 comes into contact with the pulleys 19 and 21 which make the belt 4 parallel in and out on the pulley 20, which, together with the lever 23 rotating around the fixed point 24 and the force 25, constitutes the device 16 for measuring the tension of the belt 4. A force equal to twice the tension of the belt 4 acts on the axis of the pulley 20, which is therefore measured by the transducer 25 on the basis of the balance of the lever 23.

The fixed pulleys 21 and 28 keep the belt parallel to and from a movable pulley 22, which is connected via a fork 26 to the end of the rod of the cylinder C, in whose anterior chamber a pressure is preferably sent which balances the tension of the belt 4 and which allows the rod to move while keeping the tension in the belt 4 itself constant. With the gearmotor 1'', 12 stopped, a small ascent and descent of the belt 4 is thus allowed, which is useful in the vertical movements that occur during the journey.

The pulley 28 allows the vertical descent of the belt 4 at the exit of the element 1'. Below the pulley 28 there is a second unit with sensors which measures the horizontal thrust with respect to the element 1', which arises when the patient 2 connected to the suspension belts 5, 5' wants to advance to the right or to the left according to FIG. 3. The obtained signal is used to command the advancement motor of the element 1' along the rail 3. This unit will be described in detail later.

If a different unit with sensors is used to control the feed motor of the element 1', a further pulley can be used opposite the pulley 28 to enable the vertical position of the belt 4 as it exits the element 1'.

The different pulleys may or may not have axial containment edges of the belt according to the needs required by the operation and movements of the belt 4.

According to the scheme of FIG. 3, the belt 4 is subject on the one hand to the control due to the force acting in the front chamber of the cylinder C, which tends to produce an imposed tension in the belt itself, and on the other hand to the possible control connected to the measurement of the tension obtained with the force sensor 25. To avoid contradictory actions, it is good to separate the two possible types of action. When walking on flat ground, the gearmotor 1'', 12 can be held still and the vertical oscillation is managed by the cylinder C. When the movement of the piston approaches an end position, as occurs for example when the patient 2 intends to go down, the function of the sensor 25 can be activated and switch to a control managed by the tension value of web 4 measured directly by the same sensor 25.

In the present invention, any system of the prior art can find application (for example, a system with an electromechanical drive with closed loop control on the force measuring device, or a device that is initially adjusted, such as for example a system with adjustable springs such as shown in US patents 2008/0287268 A1 dated Nov. 20, 2008 "Body weight support system and method of using the same" and U.S. Pat. No. 7,883,450 B2 dated Feb. 8, 2011 "Body weight support system and method of using the same"—ZeroG by Aretech, etc.). The pneumatic solution for cylinder C is particularly simple and easy to apply.

Figure 4:
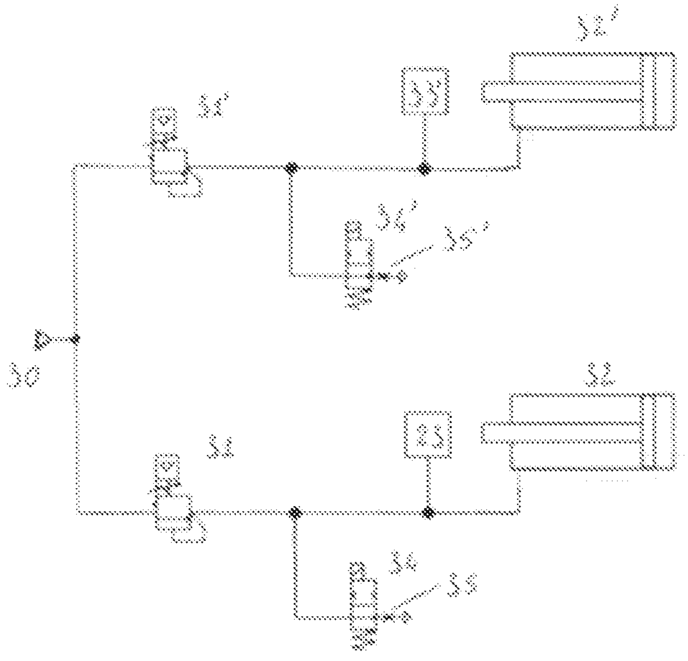
FIG. 4 shows an electropneumatic circuit of the BWS of the invention.

The diagram of the pneumatic circuit valid for the entire suspension and weight relief element 1' is shown in FIG. 4. Two proportional solenoid valves 31 and 31' are fed by the compressed air supply 30 and control the pressure in the front chambers of the two cylinders 32 and 32' which move the pulley for regulating the vertical position of the two belts 4, 4'. In this way, it is possible to have two different reliefs for the belts 4, 4' which relieves the right leg and for that which relieves the left leg. The solenoid valves 34 and 34' discharge the cylinder chambers at the end of the sessions or in emergency situations via two discharge resistances 35 and 35' to avoid emptying too quickly. Two pressure transducers 33 and 33' measure the regulated pressures.

The movement of the plungers causes a pressure change in the anterior chambers. In order to avoid the continuous intervention of the solenoid valves during this movement, according to the prior art the pressure variation can be reduced by connecting the anterior chamber to an external tank. The same volume of the front chamber of the cylinders can also be used, limiting the stroke of the piston and causing it to move between the rear head and a blocking point, without reaching the front head.

The double electric drive with voltage measurement and pneumatic (or with springs or with electromechanical drive) type allows the patient 2 to raise or lower himself and allows the normal small oscillations to be performed during walking on the ground with a constant trend. The pneumatic system (either with springs or with an electromechanical drive) allows the oscillations without involving the general electric motor for lifting and lowering, creating a smooth journey without sudden discontinuities.

If, during the walk, the patient 2 for any reason changes his attitude (tiredness, recovery of vigour, etc.) by moving his centre of gravity lower or higher, the electric motor 1'' repositions the belts 4, 4' and the pneumatic system (or with springs or with electromechanical drive) allows resuming the normal oscillations of the new path on the ground. Thus, patent WO 2019/180751 (EP 19719373.3) "System for Rehabilitating the Walk and Weight Supporting Device for Such System" is passed, which does not allow to reach a new structure automatically.

Figure 5:
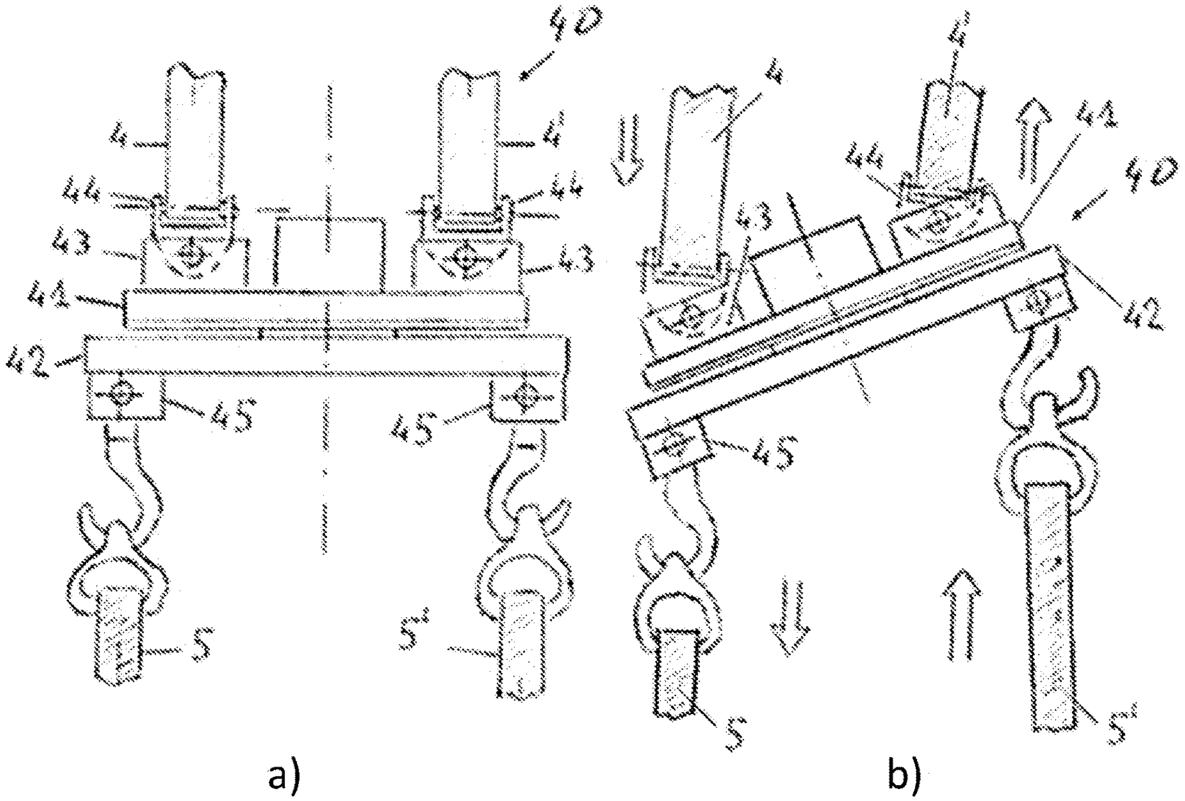
FIG. 5 shows a diagram of the rotation device: a) belts of the BWS equally protruding; b) differently protruding BWS belts.

FIG. 5 shows the rotation device 40 between the belts 4, 4' at the outlet of the suspension and weight relief element 1' and the harness of the patient 2. This device 40 must be introduced to allow certain actions in carrying out of walking exercises. The first is to allow the patient 2 to rotate on himself at the end of a linear path and to resume walking in the opposite direction, which is essential using a section of the suspension rail 3. Another useful action is to rotate, for example by 90°, to perform possible sitting and lifting exercises from a chair placed laterally to the main path.

The rotation device 40 also performs a necessary function of connection between the belts of the suspension and weight relief element 1' and the belts of the straps 5, 5', which can have different distances.

FIG. 5 shows a preferred embodiment. In FIG. 5*a*) the device 40 is in rest conditions or in conditions of equal movements for the two belts 4, 4' of the suspension and weight relief element 1'; in FIG. 5*b*), it is in the condition of different movements of the two belts 4, 4' of the suspension and weight relief element 1'.

The device 40 comprises two elements which can rotate with each other continuously in both directions: the assembly 41, which is connected to the belts 4, 4' which exit from the element for suspending and relieving the weight 1' and the assembly 42, which it is connected to the belts 5 and 5' of the harness of the patient 2. The connection of the belts takes place with kinematic torques which allow their movement to enable the free oscillations of the patient 2 practically in every direction.

The belts 4 and 4' are connected to the element 41, which comprises a rigid beam and two forks 43. These connect, via a hinge, with the flat part of a body 44, which on the opposite side has a fork which is connected at the ends of the belts 4, 4'. Here too a pin and an end eyelet of the belt allow it to rotate with respect to the body 44.

On the lower part of the device (element 42), there are two further hinged forks 45, which connect to hooks to easily connect and disconnect the sling of the patient 2 which ends with the belts 5 and 5'.

FIG. 5*b*) shows a configuration that is obtained if the belt 4 goes down and the belt 4' goes up. Consequently, the elements 41 and 42 are inclined and the harness belts move: 5 goes down and 5' goes up.

Figure 6:
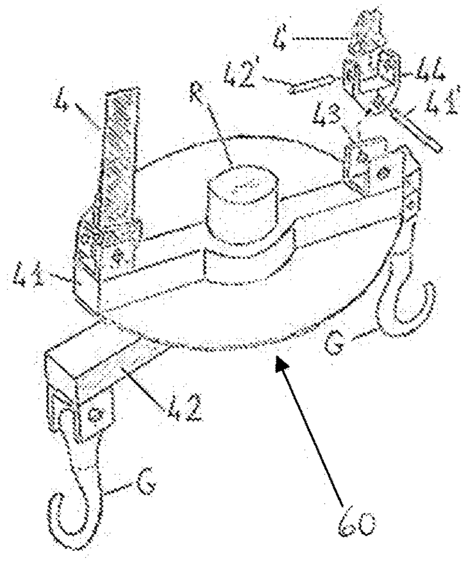
FIG. 6 shows a perspective view of the rotation device.

In FIG. 6, a perspective view shows the proposed device with the elements 41 and 42 rotated with each other. Above, it is possible to see the belts 4 and 4' and below the hooks G for hooking the harness of the patient 2.

At the top right is an exploded view with the connections of belt 4'. The fork 43 can be seen connected with the pin 41' to the body 44. The pin 42', on the other hand, connects the body 44 with the terminal eyelet of the belt 4'. At the centre of the device, the assembly R contains the bearings necessary for rotation and the necessary sensors, in particular the sensors to indicate the rotation positions reached and a gyroscopic device (not shown) to measure the attitude of the whole device 40.

The Figure also shows an accident prevention disc 60 to be connected to element 41, or to element 42, which avoids possible shearing of a hand or finger that is interposed between the beams of elements 41 and 42 when they rotate with each other. The accident-prevention disc 60 can be made of plastic, so as to reduce its weight to a minimum.

The suspension and weight relief element 1' is motorized so as to move autonomously along the suspension rail 3 avoiding strain on the patient and interference with the suspension and weight relief element 1' itself. This choice is determined by the fact that a suspension and weight relief element 1', however light and with little friction when moving forward, would in any case require a thrust force which distracts the patient 2 from his activities. As regards the rails and the drive mechanism for the advancement, reference is made to the prior art. It is then necessary to sensor the system to start the motorization of the suspension and weight relief element 1' following the advancement of the patient 2.

When the patient 2 wants to start moving forward, he moves forward with respect to the suspension and weight relief element 1', the belts 4, 4' and the other suspension elements and patient 2 himself leans backwards. As a result, a horizontal thrust force is generated on the suspension and weight relief element 1'. The measurement of this push force can be used to start the drive motor of the suspension and weight relief element 1' along the rail 3. A push force sensor is used, for example, in the suspension element and weight relief Gorbel Inc.'s SafeGait, cited above.

Figure 7:
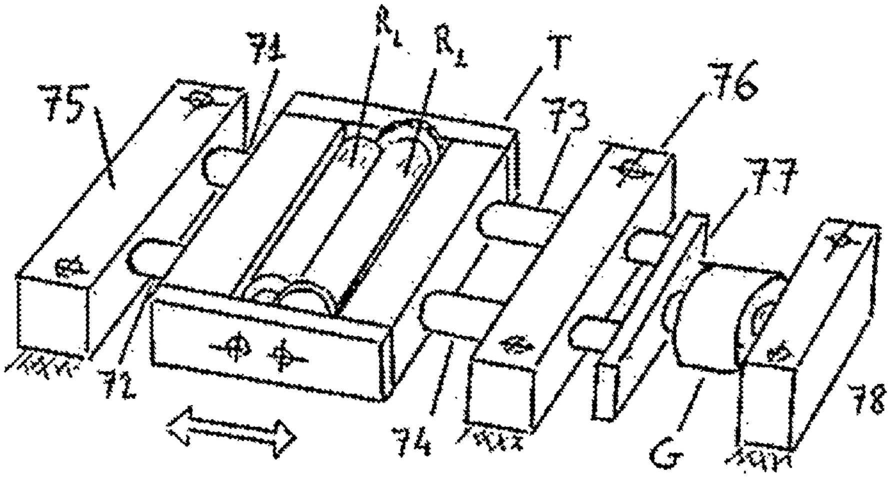
FIG. 7 shows a system with rollers for measuring thrust forces, in this case a bidirectional force coupling.

The diagram of a possible solution of a system with rollers for measuring thrust forces, in this case a bidirectional force coupling, is shown in FIG. 7.

The two rollers R1 and R2 are contained in a frame T. The belt 4, 4' passes between the two rollers R1, R2 and, moving longitudinally to the right or to the left, exerts a corresponding thrust force on the rollers R1, R2. The frame T is connected to four rods 71, 72, 73, 74 which slide in supports which are located in two blocks 75 and 76 fixed to the body of the suspension and weight relief element 1'. Rods, supports and blocks are used to allow a free translation movement of the frame T which carries the rollers R1, R2.

In the solution of FIG. 7, the thrust force is measured by means of a bidirectional force coupling G fixed on one side to the plate 77 which connects to the two rods 73 and 74 of the frame T, and on the other side to the fixed support 78.

To prevent the belt 4, 4' which passes between the rollers R1 and R2 from touching the inside of the frame T, the roller R1 is equipped at its ends with two circular plates, which enclose the roller R2 inside them.

Figure 8:
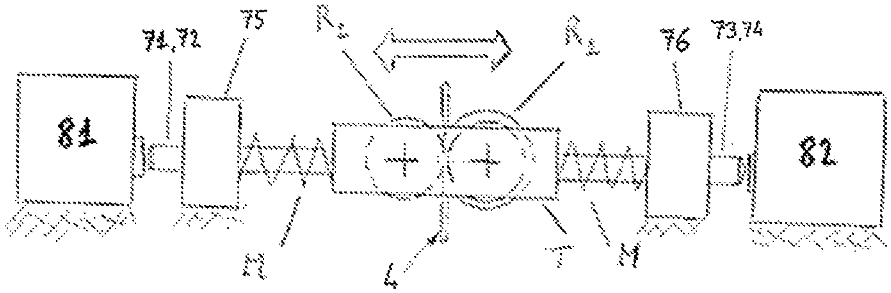
FIG. 8 shows a system with rollers for measuring thrust forces, in this case compressive force transducers.

FIG. 8 shows a variation of the previously described device, with two compressive force transducers. The two rollers R1 and R2, the frame T, the rods 71, 72, 73, 74 and the blocks 75 and 76 connected to the frame of the suspension and weight relief element 1' are always present. Instead of the force coupling G (FIG. 7), there are two compressive force transducers 81 and 82. Furthermore, on the rods, between the frame T and the blocks 75 and 76, springs M are mounted, which ensure a central position for the frame T.

By exerting a thrust force, the frame T is moved to the right or to the left; the end of the rods acts respectively on the transducer 81, for left movement, and on the transducer 82, for right movement.

As regards the measurement of the inclination of the belts 4, 4', a further preferred embodiment of a device for controlling the advancement of the suspension and weight relief element 1' is based on the direct measurement of the inclination of the belts (this is the system used in the suspension and weight relief element 1' ZeroG by ARETECH with an oscillating mechanical device equipped with two wheels, between which a belt passes).

Figure 9:
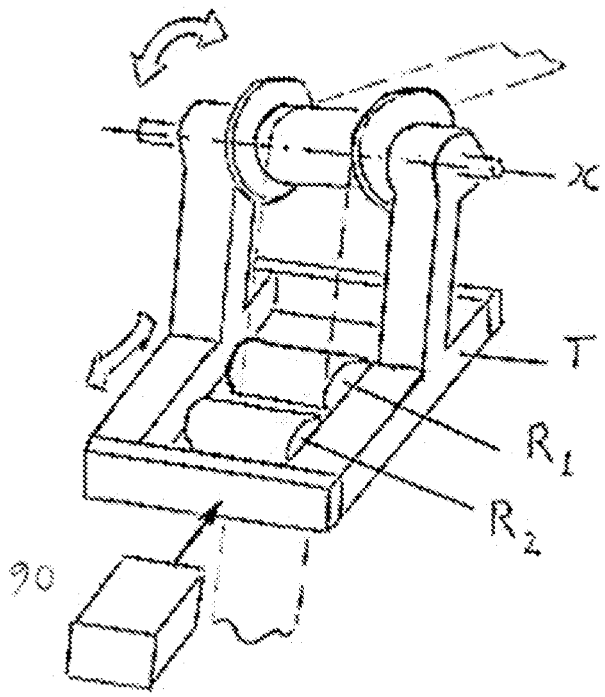
FIG. 9 shows the measurement of the inclination of the belts with an oscillating system and a laser.

The diagram of a possible mechanical system for measuring belt inclination is shown in FIG. 9. The wheels R1 and R2 are carried by the frame T which oscillates around the x axis, which is the rotation axis of the return pulley of the belt 4, 4' entering the element for suspending and relieving the weight 1' (pulley 28 of FIG. 3). The rotation of the frame T and the displacement of the base of the frame T itself, on which the wheels R1, R2 are located, allows the detection of the displacement and, therefore, of the presence of a thrust force which tilts the belt 4, 4'.

In the example of FIG. 9, a laser 90 has been indicated for measuring the displacement.

In the prior art BWS, already mentioned, electromechanical limit switches or rotation encoders are used.

Finally, as regards the measurement of the inclination of the rotation device for controlling the advancement of the suspension and weight relief element 1', it has already been indicated that the start of the journey causes an advancement of the body of the patient 2 and the forward movement, consistent with the direction of motion, of the harness. All elements connected to it (belts, rotation device, etc.) are tilted. Any system that allows the measurement of this inclination is useful to give a signal for the activation of the advancement motor of the suspension and weight relief element 1'.

Figure 10:
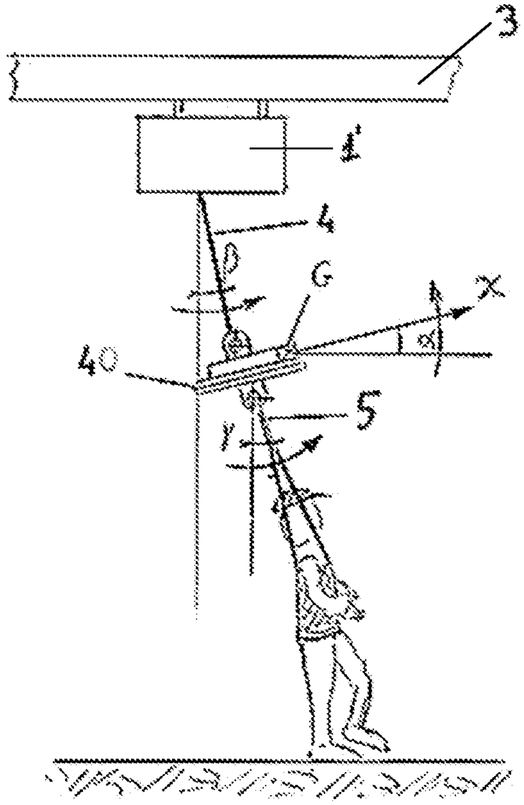
FIG. 10 shows the measurement of the inclination of the rotating plate with a gyro sensor.

FIG. 10 shows a possible solution which uses a triaxial gyroscopic sensor G located on the rotation device 40 placed between the belts 4, 4' which exit from the suspension and weight relief element 1' and the straps 5, 5' which connect to the patient 2. FIG. 10 shows the situation at the start of the movement, when the patient 2 advances and the suspension and weight relief element 1' is still stationary. All the suspension elements are inclined by different amounts with respect to the vertical axis: the bands 4, 4' by an angle $\beta$, the straps 5, 5' by an angle $\gamma$ and the rotation device 40 by an angle $\propto$. The same angle $\propto$ is the angle of inclination of the axis x of the rotation device 40 with respect to the horizontal direction, which is measured by the gyroscopic device G.

The variation of the inclination of the longitudinal axis of the gyroscope with respect to the floor therefore supplies the signal for the advancement of the suspension and weight relief element 1'.

The present invention, due to the use of two belts 4, 4' connected to the right side and to the left side of the patient 2, operated by the same gearmotor 1", 12, ensures small differences in height between the shoulders and keeps the patient 2 balanced. Therefore, it effectively counteracts the effects of loss of balance due to heels, possible during walking.

To avoid damage due to extreme accidental conditions of loss of balance, due for example to a trip that causes the patient 2 to fall forward or to failures resulting from loss of consciousness, the invention is advantageously equipped with an anti-fall system for emergency situations. A preferred embodiment of such a system is based on the signals supplied by an accelerometric sensor (not shown) for measuring anomalous accelerations and/or by a sensor 16 for measuring tension for detecting excessive values on the belts 4, 4'.

The accelerometric sensor is placed on the rotation device 40 which is located between the belts 4, 4' coming out of the suspension and weight relief element 1' and the patient's harness and substantially measures the vertical acceleration of the patient's fall. In this case, a limit acceleration value is set.

The excessive tension to be detected is that which arises when a patient 2 is no longer supported by his legs, due to fainting (for example, following fainting) or due to loss of leg support (for example, following a trip). In these cases, bending the legs, a large part of the weight ends up being discharged on the suspension belts. Only that residual part of the weight that is discharged directly onto the ground remains outside.

The "excessive tension" must therefore be greater than that normally managed during walking to activate the up/down mechanisms of the patient 2, but less than the entire weight of the patient 2.

Advantageously, emergencies can be managed directly by an operator who follows the activities of the patient 2 by activating, for example, an emergency signal with a key on a control keyboard 8 or via a touch-screen device. Following this signal, the drives are blocked, stopping the movement of the suspension and weight relief element 1' and blocking the gearmotor 1", 12 which drives the ascent and descent of the belts 4, 4'.

The present invention allows rehabilitation or maintenance of good leg functionality to be obtained, by performing numerous exercises of various types (walking on the ground, climbing and descending stairs, sitting or standing up on a seat, lifting or lowering, etc.), effortlessly for advancement and safely.

The use of the two belts/straps 4, 4', 5, 5' connected to the same axis of a single electric motor 1", with the interposition of two independent oscillation systems 17, allows total freedom of movement, realizing synchronous movements of the shoulders, oscillations on the frontal plane, yaw oscillations associated with other movements, in a totally and absolutely safe way, given that the possibility of differentiating the motions of the two shoulders is mechanically limited. In this way, the effects of loss of balance, mainly due to heeling, are counteracted, ensuring small differences in height between the shoulders and keeping the patient 2 adequately in a vertical position.

In the extreme case of tripping or loss of consciousness, damage from an accidental fall is avoided by the intervention of an emergency system.

The presence of the double belt/strap 4, 4', 5, 5' leaves patient 2 with an excellent field of vision, which is extremely useful in activities that require cognitive learning.

The use of a cylinder C, preferably pneumatic, which works at a pre-set pressure on each of the two belts/straps 4, 4,', 5, 5' which exit from the suspension and weight relief element 1', due to the compliance of the compressed air, allows the application of a constant relief force in a simple and always comfortable way for the patient 2, avoiding vibrations or sudden movements, in particular in the motion inversion step.

The independent adjustment on the two belts/straps 4, 4', 5, 5' also makes it possible to apply a different weight relief on the two sides of a patient 2, loading the legs in different ways according to therapeutic needs.

We claim:

1. A suspension and weight relief system designed to allow for walking on a ground and for leg rehabilitation exercises of a patient, the system comprising:
- a suspension rail; and
- a suspension and weight relief element designed to slide along the suspension rail, the suspension and weight relief element comprising:
  - rail support devices;
  - drive assembly with sensors and a control system, designed to activate the movement of the suspension and weight relief element along the rail to follow the walking patient or to activate its block for performing exercises while stationary;
  - at least two belts or ropes prepared for the right and left side of the patient, which are each connected to a pair of straps of a patient's harness;
  - a management system with microprocessor to allow the correct execution of the exercises, to avoid an accidental fall of the patient, and to acquire all necessary operating data;
  - a support structure for all components of the suspension and weight relief element and a protective casing;
  - a unit for the management of electricity;
  - means for transmitting energy to the suspension and weight relief element;
- at least one interface, configured to allow an operator to prepare operating cycles and for emergency signals,
  - electric cables or wireless systems for the transmission of command signals and data between the suspension and weight relief element and the at least one interface;
- a gearmotor operatively connected to a reduction unit with two output shafts for driving the at least two belts in the context of small relative displacements; and
- a balancing pneumatic cylinder placed on each of the at least two belts.

2. The suspension and weight relief system of claim 1, further comprising a rotation device to allow a motion of the patient to be reversed at the end of a linear movement or to rotate the patient by an angle suitable for performing fixed-position exercises, the rotation device being placed inside the suspension and weight relief element, between the drive assembly for advancing the suspension and weight relief element along the rail and an assembly for managing the suspension of the patient, or between the ends of the at least two belts which come out below the suspension and weight relief element and the pair of straps of the patient's harness.

3. The suspension and weight relief system of claim 2, wherein the drive assembly is driven with an electric motor on board the suspension and weight relief element or with a motor external to the suspension and weight relief element and a transmission system comprising traction ropes or toothed belts.

4. The suspension and weight relief system of claim 1, wherein the suspension and weight relief element of the patient comprises:
- the gearmotor which drives the reduction unit with the two output shafts symmetrical with respect to the reduction unit;
- two symmetrical units, each connected to one of the two output shafts and comprising a winding pulley on which each of the at least two belts are wound or unwound, a device for measuring the tension in each of the at least two belts, a device to allow free oscillations during travel, and a transmission pulley to return each of the at least two belts and to allow it to descend vertically.

5. The suspension and weight relief system of claim 4, wherein the device for measuring the tension of the at least two belts is used to drive the gearmotor with the reducer for winding and unwinding each of the at least two belts on the winding pulley, when lifting and lowering the patient, or to also control the device which allows free oscillations along the way, if this device is a closed-loop controlled system.

6. The suspension and weight relief system of claim 5, further comprising a belt management unit comprising:

the winding pulley rotated by one of the two output shafts that come out of the reducer driven by the gearmotor;

an assembly of further pulleys comprising a guide pulley, a tension pulley, a first fixed pulley, a movable pulley, and a second fixed pulley;

a cylinder to manage weight relief and vertical oscillation during walking;

a first unit with sensors for measuring the tension of the belt; and a second unit with sensors for measuring a horizontal thrust force on the suspension and weight relief element resulting from an intention to advance of the patient and to control the electric motor for advancement of the suspension and weight relief element along the rail;

other sensors and elements for system control and management;

wherein, starting from the winding pulley, the belt comes into contact with the guide pulley and the first fixed pulley which make the belt parallel in and out of the tension pulley, which, together with a lever rotating around a fixed point and a force sensor, constitutes the first unit with sensors for measuring the tension of the belt, wherein the axis of the tension pulley is subjected to a force equal to twice the tension of the belt, which is then measured by the force sensor on the basis of the balance of the lever, and wherein the fixed pulleys keeping the belt parallel into and out of the movable pulley, which is connected via a fork to an end of a rod of the cylinder in whose front chamber a pressure is sent which balances the tension of the belt and which allows the rod to move while keeping the tension in the belt constant.

7. The suspension and weight relief system of claim 6, wherein the second unit with sensors is disposed below the transmission pulley.

8. The suspension and weight relief system of claim 2, wherein the rotation device comprises:

a first element, which is connected to the at least two belts coming out of the suspension and weight relief element, the first element comprising:

a rigid beam;

two forks hinged to a flat part of a body; and a connection fork disposed on an opposite side of the body and connected to ends of the at least two belts; and a second element, which is connected to the pair of straps of the patient's harness, the second element comprising two hinged forks connected to hooks for easy connection and disconnection of the patient's harness, wherein the first element and the second element are rotatable relative to each other continuously in both directions.

9. The suspension and weight relief system of claim 8, further comprising, at the centre of the rotation device, an assembly R comprising bearings necessary for rotation and the necessary sensors.

10. The suspension and weight relief system of claim 9, further comprising an accident prevention disc to be connected to the first element or to the second element, the accident prevention disc configured to prevent shearing of a hand or a finger that comes between the first and second elements when they rotate with each other.

11. The suspension and weight relief system of claim 1, wherein the suspension and weight relief element is motorized so as to move autonomously along the suspension rail avoiding strain on the patient and interference with the suspension and weight relief element.

12. The suspension and weight relief system of claim 1, wherein, when the patient moves forward with respect to the suspension and weight relief element and the at least two belts tilt backwards, a horizontal thrust force is generated on the suspension and weight relief element where the measure of this horizontal thrust force is used to start the electric motor of the suspension and weight relief element along the rail, and a sensor of the horizontal thrust force in the suspension and weight relief element.

13. The suspension and weight relief system of claim 1, further comprising a system with rollers for measuring horizontal thrust forces, the system comprising:

a first roller and a second roller contained in a frame, wherein each of the at least two belts passes between the two rollers and, when moving longitudinally to the right or left, exerts on the rollers a corresponding horizontal thrust force;

four rods connected to the frame and sliding in supports located in a first block and a second block, both blocks fixed to the body of the suspension and weight relief element; and a bidirectional force coupling fixed on one side to a plate which connects to the two rods of the frame, and on the other side to a fixed support, the bidirectional force coupling configured to measure the horizontal thrust force;

wherein, to prevent each of the at least two belts passing between the rollers from touching the inside of the frame, the first roller has two circular plates at its ends which enclose the second roller inside them.

14. The suspension and weight relief system of claim 1, wherein the means for transmitting energy comprises cables suspended from the rail.

15. The suspension and weight relief system of claim 1, wherein the at least one interface comprises a command keypad or a touch-screen interface.

16. The suspension and weight relief system of claim 1, wherein the unit for the management of electricity is further configured to generate compressed air for the pneumatic cylinder.

17. The suspension and weight relief system of claim 2, wherein the fixed-position exercises comprise sitting and standing exercises or lifting and lowering exercises.

18. The suspension and weight relief system of claim 6, wherein the cylinder is pneumatic.

19. The suspension and weight relief system of claim 9, wherein the assembly R comprises sensors configured to indicate the rotation positions reached and a gyroscopic device for measuring the attitude of the rotation device.

* * * * *